US008571782B2

(12) United States Patent
Barkowski et al.

(10) Patent No.: US 8,571,782 B2
(45) Date of Patent: Oct. 29, 2013

(54) COMPUTER SYSTEM FOR USE IN VEHICLES

(75) Inventors: Andre Barkowski, Salzgitter (DE); Peter Siepen, Hildesheim (DE); Torsten Mlasko, Hildesheim (DE); Wolfgang Baierl, Remshalden (DE); Andreas Westendorf, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 585 days.

(21) Appl. No.: 10/544,098

(22) PCT Filed: Nov. 4, 2003

(86) PCT No.: PCT/DE03/03646
§ 371 (c)(1),
(2), (4) Date: May 4, 2006

(87) PCT Pub. No.: WO2004/068344
PCT Pub. Date: Aug. 12, 2004

(65) Prior Publication Data
US 2007/0005802 A1    Jan. 4, 2007

(30) Foreign Application Priority Data
Jan. 31, 2003    (DE) .................................. 103 04 114

(51) Int. Cl.
*G06F 19/00* (2011.01)
*G06G 7/70* (2006.01)
*G01C 21/00* (2006.01)

(52) U.S. Cl.
USPC ........................................... 701/100; 701/213

(58) Field of Classification Search
USPC .......... 701/100, 213; 362/147, 234, 249, 253, 362/368, 404, 405, 249.01; 348/552; 345/169; 463/4, 17, 36
See application file for complete search history.

(56) References Cited

U.S. PATENT DOCUMENTS

| | | | | |
|---|---|---|---|---|
| 4,433,363 A | * | 2/1984 | Weber | 362/86 |
| 4,528,620 A | * | 7/1985 | Weber | 362/86 |
| 4,896,262 A | * | 1/1990 | Wayama et al. | 710/65 |
| 5,274,560 A | * | 12/1993 | LaRue | 701/533 |
| 5,455,823 A | * | 10/1995 | Noreen et al. | 370/312 |
| 5,497,149 A | * | 3/1996 | Fast | 340/988 |
| 5,627,547 A | * | 5/1997 | Ramaswamy et al. | 342/357.57 |
| 5,734,589 A | * | 3/1998 | Kostreski et al. | 715/716 |
| 5,794,164 A | * | 8/1998 | Beckert et al. | 455/3.06 |

(Continued)

FOREIGN PATENT DOCUMENTS

| | | |
|---|---|---|
| EP | 0 514 972 | 11/1992 |
| EP | 1 000 810 | 5/2000 |

(Continued)

OTHER PUBLICATIONS

Manstetten et al., Determination of Traffic Characteristics Using Fuzzy Logic, 1996, IEEE, p. 43-53.*

(Continued)

*Primary Examiner* — Khoi Tran
*Assistant Examiner* — Nicholas Kiswanto
(74) *Attorney, Agent, or Firm* — Kenyon & Kenyon LLP

(57) ABSTRACT

A computer system for vehicles is provided in which the functions are partitioned among the computers of the computer system. A first computer takes over the driving-related functions, while a second computer having greater computing power takes over entertainment-specific functions.

22 Claims, 1 Drawing Sheet

(56) References Cited

U.S. PATENT DOCUMENTS

| | | | |
|---|---|---|---|
| 5,828,585 A * | 10/1998 | Welk et al. | 702/96 |
| 5,852,610 A * | 12/1998 | Olaniyan | 370/486 |
| 5,931,874 A * | 8/1999 | Ebert et al. | 701/1 |
| 5,959,536 A * | 9/1999 | Chambers et al. | 710/104 |
| 6,009,355 A * | 12/1999 | Obradovich et al. | 701/1 |
| 6,055,478 A * | 4/2000 | Heron | 701/486 |
| 6,067,031 A * | 5/2000 | Janky et al. | 340/903 |
| 6,131,051 A * | 10/2000 | Beckert et al. | 700/83 |
| 6,148,253 A * | 11/2000 | Taguchi et al. | 701/48 |
| 6,150,925 A * | 11/2000 | Casazza | 340/425.5 |
| 6,185,491 B1 * | 2/2001 | Gray et al. | 701/36 |
| 6,240,347 B1 * | 5/2001 | Everhart et al. | 701/36 |
| 6,317,684 B1 * | 11/2001 | Roeseler et al. | 701/428 |
| 6,345,767 B1 * | 2/2002 | Burrus et al. | 236/1 R |
| 6,353,785 B1 * | 3/2002 | Shuman et al. | 701/48 |
| 6,401,033 B1 * | 6/2002 | Paulauskas et al. | 701/410 |
| 6,434,459 B2 * | 8/2002 | Wong et al. | 701/36 |
| 6,904,341 B2 * | 6/2005 | Kish et al. | 701/21 |
| 7,301,536 B2 * | 11/2007 | Ellenby et al. | 345/419 |
| 7,379,800 B2 * | 5/2008 | Breed | 701/29 |
| 2001/0002455 A1 * | 5/2001 | Uekawa et al. | 701/200 |
| 2001/0022553 A1 * | 9/2001 | Pala et al. | 340/901 |
| 2001/0041956 A1 * | 11/2001 | Wong et al. | 701/36 |
| 2002/0002432 A1 * | 1/2002 | Bockmann et al. | 701/48 |
| 2002/0116120 A1 * | 8/2002 | Ruiz et al. | 701/208 |
| 2002/0164973 A1 * | 11/2002 | Janik et al. | 455/403 |
| 2003/0006892 A1 * | 1/2003 | Church | 340/439 |
| 2003/0045996 A1 * | 3/2003 | Yamazaki et al. | 701/200 |
| 2003/0046327 A1 * | 3/2003 | Reinold et al. | 709/200 |
| 2003/0085805 A1 * | 5/2003 | Paulo | 340/425.5 |
| 2003/0093199 A1 * | 5/2003 | Mavreas | 701/33 |
| 2003/0129961 A1 * | 7/2003 | Weisshaar et al. | 455/403 |
| 2003/0195676 A1 * | 10/2003 | Kelly et al. | 701/29 |
| 2006/0244581 A1 * | 11/2006 | Breed et al. | 340/447 |
| 2007/0126561 A1 * | 6/2007 | Breed | 340/426.13 |
| 2008/0034409 A1 * | 2/2008 | O'Rourke et al. | 726/4 |

FOREIGN PATENT DOCUMENTS

| | | |
|---|---|---|
| EP | 1 259 032 | 11/2002 |
| JP | 3-150678 | 6/1991 |
| JP | 5002267 | 1/1993 |
| JP | 7-78298 | 3/1995 |
| JP | 7-293320 | 11/1995 |
| JP | 8-44678 | 2/1996 |
| JP | 8110804 | 4/1996 |
| JP | 8-218704 | 8/1996 |
| JP | 10-119671 | 5/1998 |
| JP | 10-329628 | 12/1998 |
| JP | 11272166 | 10/1999 |
| JP | 2000-332780 | 11/2000 |
| JP | 2001-22599 | 1/2001 |
| JP | 20010022599 | 1/2001 |
| JP | 2001-155295 | 6/2001 |
| JP | 2001-358910 | 12/2001 |
| JP | 2002-77174 | 3/2002 |
| JP | 2002-175539 | 6/2002 |
| JP | 2002-524344 | 8/2002 |
| JP | 2002232772 | 8/2002 |
| WO | WO 98/36351 | 8/1998 |
| WO | 99 48021 | 9/1999 |
| WO | 99 64952 | 12/1999 |

OTHER PUBLICATIONS

"Voodoo 2—What is it and what can it do? The Q&A, the Guru 3D part 2—Voodoo 2", 1999, Hilbert Hagedoorn, XP-002347311.

* cited by examiner

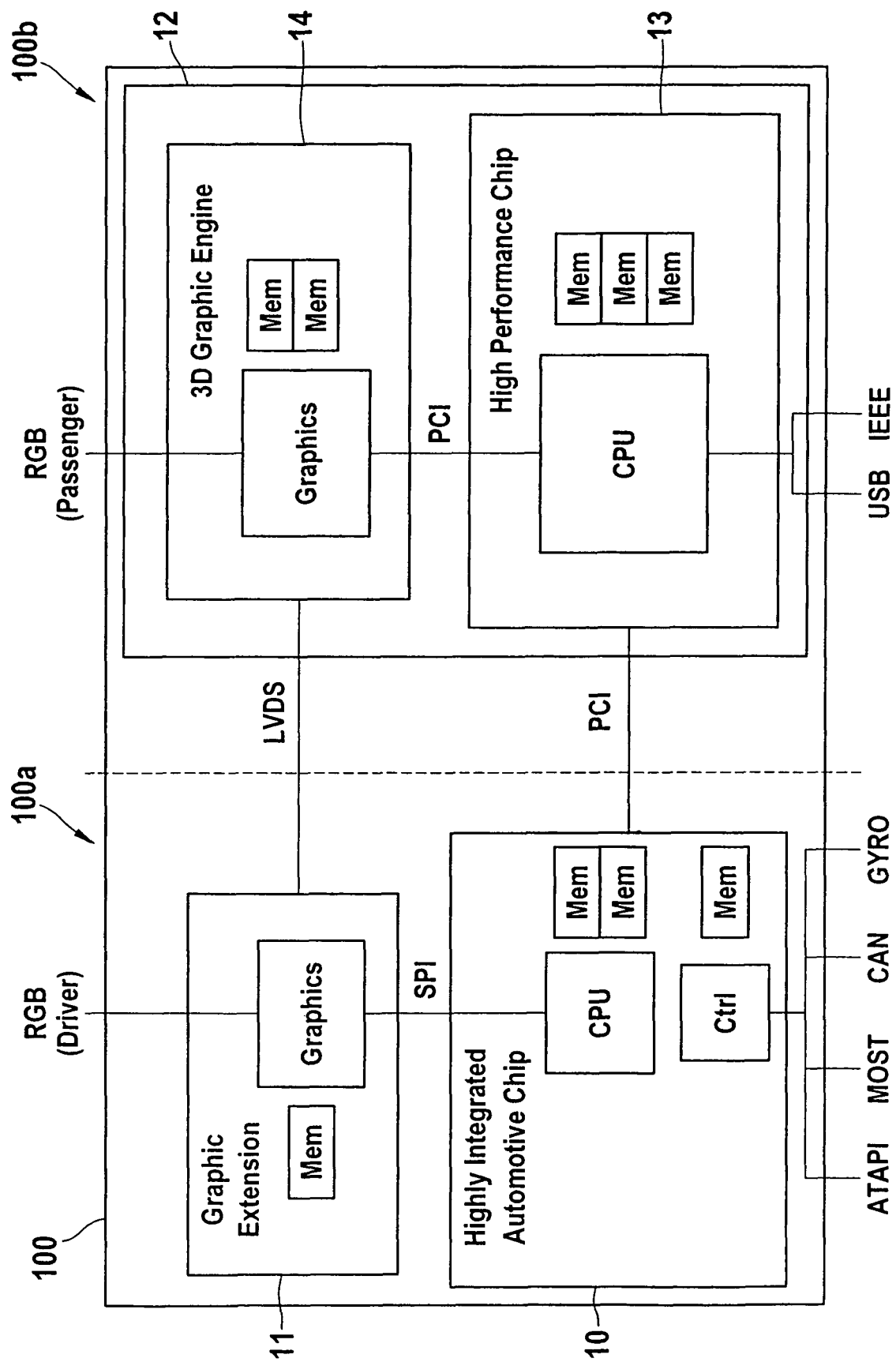

COMPUTER SYSTEM FOR USE IN VEHICLES

FIELD OF THE INVENTION

The present invention relates to a computer system in a vehicle.

BACKGROUND INFORMATION

Systems currently used in vehicles, e.g. navigation systems or entertainment systems, are often independent of one another, or are dependent on one another in one way or another. For example, individual processors may be provided for navigation tasks, for representing the human-machine interface, for vehicle and climate control, etc. In partitioning a complex system among various processors having precisely circumscribed tasks, a very precise separation with a very precisely defined interface is necessary. This leads to a risk of failure or problems when there are conflicting instructions in the various system areas. If, on the other hand, one processor takes over a plurality of tasks, this processor must either be designed for the simultaneous execution of all the tasks, or declines in performance must be accepted when the processor is heavily loaded.

SUMMARY OF THE INVENTION

The partitioning of tasks and/or functions among at least two computers according to the characteristics of the task and/or function, one computer executing tasks and/or functions that are essentially vehicle-related (vehicle system or driver information system) while the other executes tasks/functions that are essentially not related to driving or to the vehicle (entertainment systems), has the advantage of permitting vehicle/driver information systems and entertainment systems to be considered separately. Above all, this makes it possible to design the entertainment system as an open system and the vehicle system as a closed system. In this way, the safety of the vehicle system is ensured despite the open architecture of the entertainment system (e.g., Internet connection, software downloading). Here, an open system is understood as one that is set up for communication with the external world, and which for example also permits the user to make changes to its software or its configuration, whereas a closed system does not offer these possibilities.

A particular advantage of such a partitioning is the scalability of the system with respect to different levels of equipment of the overall computer system and of the subsystems. Different levels of equipment of the system are enabled without requiring extensive modifications of the system. In this way, a vehicle controlling alone (climate control and driver warning systems), an expanded vehicle controlling (additionally including navigation, radio, etc.), and a high-end equipping (additionally including entertainment, information, etc.) can be achieved by expanding the computer system with additional hardware components (plus the required software).

In addition, an independence of cycles of innovation is advantageously achieved, because the non-driving-related system is designed as an open system and can thus rapidly follow cycles of innovation, while the driving-related system, which is subject to fewer cycles of innovation, does not take part in these modifications. This holds not only for the software, but also for the components of the consumer electronics, which are constantly becoming more powerful, and which can be exchanged due to the fact that the entertainment part of the system is an open system.

In addition, the subsystems in the vehicle are independent from one another with respect to their availability, so that for vehicle-relevant information, which must always be precisely available (e.g., navigational indications, driver warnings, etc.), availability is ensured, because information relating to entertainment (e.g., video display), does not load the driving-related part.

In addition, it is particularly advantageous that the bus or bus systems in the vehicle are always connected to the same subsystem, independent of any additional equipment, in particular entertainment equipment, that may be provided.

In addition, the present solution by partitioning contributes to a minimization of risk because the driving-related systems are separated from the entertainment systems, which can be liable to error, e.g. caused by the downloading of new functions. Likewise, in this way the predictability of the behavior of the driving-related part of the system is ensured.

BRIEF DESCRIPTION OF THE DRAWING

In the following, the present invention is illustrated on the basis of the specific embodiments shown in the drawing. The single FIGURE shows an example of a computer system in which driving-related tasks and non-driving-related tasks are separated.

DETAILED DESCRIPTION

The computer system shown in the FIGURE is made up essentially of two processors that divide task areas that are essentially demarcated from one another. Besides the demarcated tasks, individually selected tasks are present that can be flexibly exchanged, in particular tasks that require high computing power. The demarcation takes place according to the characteristics of the functions, a distinction being made between driving-related functions and non-driving-related (entertainment-related) functions.

A first processor 10 (possibly in combination with a graphics processor) takes over driving-related functions and/or tasks, such as for example connection to vehicle bus systems such as Controller Area Network ("CAN"), Media Oriented System Transport ("MOST"), etc., climate control, navigation, driver warning systems, evaluation and representation of a two-dimensional map for navigation, speech output, human-machine interface, etc. In other words, this subsystem realizes a driver information system, including an operating interface for vehicle functions. On the other side there is a processor 12 (together with a graphics processor) that is powerful and is for example used in conventional personal computers, and that takes over tasks that are not driving-related, for example game applications, Internet connection, video applications, entertainment systems in general (in particular for passengers), and that is set up for the downloading of new applications related to these functions, and that realizes the bus connection to entertainment electronics, such as for example Personal Digital Assistants ("PDAs"), laptops, etc. Thus, in this way an entertainment and information system is realized.

The functions of this computer system are made up of functions from consumer electronics (especially entertainment functions) and driving-related electronics (especially driving functions and driver information functions) that are here respectively realized on separate computers of the system. In an embodiment, there is an area of overlap between the entertainment and driving functions. For example, a three-dimensional graphic (e.g., a map for navigation as a driving-related function) can be used for entertainment and can be represented by the other (entertainment) processor. Another example is MP3 functionality, which, in connection with audio applications, actually belongs to the entertainment part. However, an MP3 decoding is also a standard function of the automobile radio (driving-related part), so that this decoding can be taken over in the entertainment processor or in the driving-related application. For example, MP3 decoding is important for speech output. For this reason, the two processors are connected to one another via at least one interface, so that the output data and/or the results of selected tasks, or brief, computing-intensive applications such as speech recognition or high-quality speech synthesis programs, can be sent in swapped fashion from the driving-related processor to the more powerful entertainment processor, or vice versa. The functionality required for this is then present in redundant fashion in both processors, so that if the entertainment system fails or is absent, the driving-related part can likewise realize the function.

In this context, the driving-related part of the computing system is always the master system, and the entertainment processor is the slave.

The Figure shows a preferred embodiment of the computer system. The depicted computer system 100 shows the driving-related part 100a, as well as a non-driving-related part 12. Driving-related part 100a is made up of a processor 10 and a graphics processor 11. Processor 10 comprises a CPU, various memories (Mem), and an interface for connecting to vehicle bus systems such as Advanced Technology Attachment Packet Interface ("ATAPI") MOST, CAN, or to sensors or actuators of the vehicle system (e.g. GYRO). In addition, the processor has an interface, e.g. Serial Peripheral Interface ("SPI"), to graphics processor 11, and an additional interface to the non-driving-related part, e.g. a Peripheral Component Interconnect ("PCI") interface. Graphics processor 11 is made up of a computing core with memory, and is on the one hand connected to processor 10 via an interface SPI, and is connected to display means for the driver via an additional interface, for example a Red-Green-Blue ("RGB") interface, and is connected via a third interface, for example an Low Voltage Data Signal ("LVDS") interface, with the graphics processor of non-driving-related part 12.

Non-driving-related part 12 has a multimedia processor 13 having high computing power, and also has a high-performance graphics processor 14 that can process high-resolution graphics, including three-dimensional graphics. Processor 13 has a central unit (CPU) as well as various memories (Mem), and has a first interface to processor 10 of the driving-related part (PCI), a second interface (likewise PCI) to graphics processor 14, and an additional interface to bus interfaces, such as USB, IEEE, etc. Standard entertainment electronics or computers can be connected to these interfaces. Graphics processor 14, which is likewise provided with memory, has, besides the interface to processor 13, the above-mentioned interface LVDS to the graphics processor of the driving-related part of the computer system, as well as an additional interface for displaying graphics to the passengers of the vehicle. This interface is for example realized as an RGB interface.

The partitioning of the functions into driving-related and non-driving-related takes place according to their characteristics; the essentially driving-related functions, containing specific information connected with operating, navigating, and guiding the vehicle, or warning and orienting the driver, are realized in the driving-related part, while primarily non-driving-related functions, containing non-specific information for the guiding of the vehicle and for animation, entertainment, and information for the passengers, are realized in the entertainment part 12 of the computer system. For the driving-related functions, the focus is placed on maximum availability and reliability of the functionalities, because the functions are essential for driving the vehicle, as well as on internal linking with the vehicle buses. Such vehicle-specific functions include navigation systems, "Human Machine Interface"and/or "Human Media Interaction"("HMI") logic systems or HMI managers that control or evaluate the displays and operation of the vehicle, speech recognition and/or speech synthesis software, programs for outputting driving instructions and/or driver warnings, and the representation of two-dimensional maps for orientation. Thus, in the broadest sense they concern driver-related HMI, or a driver information system. Non-driving-related functions include Internet browsers, download of services, representation of three-dimensional graphics, applications for passenger entertainment, games, video reproduction systems, digital video broadcast systems, mobile office functions, portable devices such as laptops, PDAs, etc., that can be connected to the entertainment part. In the entertainment part of the computer system, the focus is placed on the provision of maximum power for the functions and on the openness of the system (e.g. downloading software) as well as on external networking (for example with the Internet).

In a specific embodiment, the separation represented above has areas of overlap. For example, via the LVDS interface, graphics-intensive applications, e.g. three-dimensional representations such as a three-dimensional navigation map, or three-dimensional models for viewing vehicle settings, e.g. for climate or sound adjustments, animations (transition animations during mask changes, animated elements in masks, animated operating assistants, etc.), or background images having a high memory requirement that are associated with functions of the driving-related part, are calculated in the entertainment part, not in the driving-related part, due to the computing power required, and are exchanged via the LVDS interface. In addition, brief computing-intensive applications, e.g. speech recognition with natural voice activation and the expanded recognition possibilities associated therewith, as well as speech synthesis with improved output quality, are exchanged with the powerful processor 13 of the entertainment part, e.g. via the PCI interface, and are computed there. Here it is to be noted that the cited functions are present in redundant fashion, and can also be executed in the driving-related part in the case of failure or absence of the entertainment system. All other functions are present without redundancy.

Thus, it is essential that in a computer system the individual functions are partitioned according to their significance for driving the vehicle, so that driving-related functions, i.e., functions that are essential to the driver for driving the vehicle, are calculated in a driving-related processor, while non-driving-related systems, e.g., functions that are inessential for driving the vehicle and are used for entertainment, in particular of the passengers, are computed in a powerful multimedia computer, the two computers preferably being connected to one another via interfaces.

What is claimed is:

1. A computer system in a vehicle, comprising:
   at least two computers that perform different tasks,
   wherein a distribution of the tasks among the at least two computers takes place according to a significance of functions for a driving of the vehicle, the functions including driving-related functions that are implemented in a first computer of the at least two computers, and non-driving-related functions that are implemented in a second computer of the at least two computers, and at least one driving-related function is temporarily distributed to the second computer for execution, and wherein a first computer of the at least two computers gives computing-intensive tasks to a second computer of the at least two computers, and the first computer executes the computing-intensive tasks if the second computer is not available.

2. The computer system as recited in claim 1, wherein the driving-related functions are vehicle-specific functions.

3. The computer system as recited in claim 1, wherein:
the driving-related functions contain specific information connected with at least one of:
one of an operation, a navigation, and a driving of the vehicle, and
a warning and an orientation of a driver, and
the driving-related functions form a driver-related Human Machine Interface ("HMI") and a driver information system.

4. The computer system as recited in claim 1, wherein the non-driving-related functions are entertainment-specific functions.

5. The computer system as recited in claim 1, wherein:
the driving-related functions include at least one of the following functions:
navigation systems,
one of a Human Machine Interface ("HMI") logic system and an HMI manager that one of controls and evaluates a display and an operation of the vehicle,
one of speech recognition software and speech synthesis software,
a program for outputting one of driving instructions and driver warnings, and
a representation of two-dimensional maps for orientation, and the non-driving-related functions include at least one of the following functions:
an Internet browser,
a service download,
a representation of three-dimensional graphics,
an application for entertaining passengers,
a game,
a video reproduction system,
a digital video broadcast system, and
a connection of connectable portable devices including one of a laptop and a PDA.

6. The computer system as recited in claim 1, wherein the second computer is a powerful multimedia computer.

7. The computer system as recited in claim 1, further comprising:
at least one interface provided between the first computer and the second computer.

8. The computer system as recited in claim 1, wherein first computer is connected to an internal vehicle bus.

9. The computer system as recited in claim 1, wherein a computing-intensive function of a driving-related part is are computed in a non-driving-related part.

10. A computer system in a vehicle, comprising:
a first processing unit in the vehicle, configured to perform critical driving-related functions, wherein the first processing unit is substantially closed from end-user modifications;
a second processing unit in the vehicle, configured to perform an auxiliary set of functions, wherein the second processing unit is configurable by the end-user; and
a data transfer connection between the first and second processing units;

wherein the system is configured to distribute critical driving-related functions to the first processing unit and the second processing unit, based at least in part on an availability of the respective processing units and on how processing-intensive the functions are, wherein the first processing unit gives processing-intensive tasks to the second processing unit and the first processing unit executes the processing-intensive tasks if the second processing unit is not available, and wherein the system is configured to distribute the auxiliary set of functions exclusively to the second processing unit.

11. The system of claim 10, wherein the system is configured to modify the auxiliary second set of functions based on user input, and wherein the system is configured to restrict modification of the driving-related functions.

12. The system of claim 10, wherein the second processing unit is a receiving subsystem with an interface configured to interface with a plurality of equipment added to the system via the interface.

13. The system of claim 10, wherein the auxiliary second set of functions include enhancements of the driving-related functions.

14. The system of claim 13, wherein one enhancement includes interactive graphical maps, and wherein one driving-related function, associated with the one enhancement, includes basic navigation data.

15. The system of claim 10, wherein the first processing unit is configured as a master processing unit and the second processing unit is configured as a slave processing unit.

16. The system of claim 10, wherein the second processing unit is configured with more processing power than the first processing unit.

17. The system of claim 16, wherein the second processing unit is optimized for multimedia processing.

18. The system of claim 10, wherein the system is configured to modify the auxiliary second set of functions based on user input, wherein the system is configured to restrict modification of the driving-related functions, wherein the second processing unit is a receiving subsystem with an interface configured to interface with a plurality of equipment added to the system via the interface, wherein the auxiliary second set of functions include enhancements of the driving-related functions.

19. The system of claim 18, wherein one enhancement includes interactive graphical maps, and wherein one driving-related function, associated with the one enhancement, includes basic navigation data, wherein the first processing unit is configured as a master processing unit and the second processing unit is configured as a slave processing unit, wherein the second processing unit is configured with more processing power than the first processing unit, and wherein the second processing unit is optimized for multimedia processing.

20. A computer system in a vehicle, comprising:
a graphics processor; and
at least two computers that perform different tasks, a distribution of the tasks among the at least two computers being performed in accordance with a significance of functions for guidance of the vehicle,
wherein:
a first one of the computers includes functions related to driving,
a second one of the computers includes functions not related to driving,
the computers are connected to the graphics processor, the computers communicate with each other via one predefined interface, a function related to driving primarily performed by the first one of the computers is temporarily distributed to the second one of the computers for execution, and the first one of the computers gives computing-intensive tasks to the second one of the computers, and the first one of the computers executes the computing-intensive tasks if the second one of the computers is not available.

21. A computer system in a vehicle, comprising:
a graphics processor; and
at least two computers that perform different tasks, a distribution of the tasks among the at least two computers being performed in accordance with a significance of functions for guidance of the vehicle,
wherein:
  a first one of the computers includes functions related to driving, wherein a second one of the computers includes functions not related to driving,
  the computers are connected to the graphics processor, wherein the computers communicate with each other via one predefined interface,
  a critical function related to driving is routed to the second one of the computers via the one predefined interface, the first one of the computers routes computing-intensive tasks to the second one of the computers, and the first one of the computers executes the computing-intensive tasks if the second one of the computers is not available, and
  the first one of the computers is a closed system, the second one of the computers is an open system, and the open system permits a user to make changes to software or to a configuration.

22. A computer system in a vehicle, comprising:
at least two computers that perform different tasks, a distribution of the tasks among the at least two computers being performed in accordance with a significance of functions for guidance of the vehicle;
a first graphics processor; and
a second graphics processor;
wherein:
  a first one of the at least two computers includes functions related to driving,
  a second one of the at least two computers includes functions not related to driving,
  the at least two computers communicate with each other via one predefined interface,
  the first one of the computers gives computing-intensive tasks to the second one of the computers, and the first one of the computers executes the computing-intensive tasks if the second one of the computers is not available,
  the first one of the at least two computers is connected to the first graphics processor,
  the second one of the at least two computers is connected to the second graphics processor,
  the graphics processors communicate with each other via the one predefined interface, and
  the first one of the at least two computers is a closed system, the second one of the at least two computers is an open system, and the open system permits a user to make changes to a software program or to a configuration.

* * * * *

UNITED STATES PATENT AND TRADEMARK OFFICE
CERTIFICATE OF CORRECTION

PATENT NO. : 8,571,782 B2  Page 1 of 1
APPLICATION NO. : 10/544098
DATED : October 29, 2013
INVENTOR(S) : Barkowski et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1115 days.

Signed and Sealed this
Twenty-second Day of September, 2015

Michelle K. Lee
*Director of the United States Patent and Trademark Office*